(12) United States Patent
Brawn et al.

(10) Patent No.: US 7,839,532 B2
(45) Date of Patent: Nov. 23, 2010

(54) METHODS AND APPARATUS FOR IMAGING DOCUMENTS

(75) Inventors: Dennis E. Brawn, Avondale, AZ (US); James M. King, Peoria, AZ (US)

(73) Assignee: IPRO Tech, Inc., Phoenix, AZ (US)

( * ) Notice: Subject to any disclaimer, the term of this patent is extended or adjusted under 35 U.S.C. 154(b) by 1156 days.

(21) Appl. No.: 10/735,330

(22) Filed: Dec. 12, 2003

(65) Prior Publication Data
US 2005/0128527 A1 Jun. 16, 2005

(51) Int. Cl.
*G06K 15/00* (2006.01)
*G03G 15/00* (2006.01)
*G06F 17/00* (2006.01)

(52) U.S. Cl. .................. 358/1.18; 358/1.16; 358/1.13; 358/1.1; 715/200; 715/243; 399/407; 399/408; 399/410

(58) Field of Classification Search .......... 358/401, 358/486, 1.15–1.18, 505, 501, 448, 452, 358/453, 474, 527, 537, 538, 1.1, 1.2, 1.9; 399/381, 407, 408, 410; 715/238, 246, 247, 715/251, 255, 273–277, 727, 728, 788; 345/473
See application file for complete search history.

(56) References Cited

U.S. PATENT DOCUMENTS

| | | | | |
|---|---|---|---|---|
| 5,095,369 A * | 3/1992 | Ortiz et al. | .................. | 358/296 |
| 5,369,733 A * | 11/1994 | Arimoto et al. | .............. | 358/1.2 |
| 5,717,843 A * | 2/1998 | Tabata et al. | ............... | 358/1.18 |
| 5,848,325 A * | 12/1998 | Matsumura | ................... | 399/83 |
| 5,903,646 A * | 5/1999 | Rackman | ...................... | 705/51 |
| 5,960,448 A * | 9/1999 | Reichek et al. | ............. | 715/236 |
| 6,111,659 A * | 8/2000 | Murata | ....................... | 358/296 |
| 6,115,510 A * | 9/2000 | Koga | ........................... | 382/309 |
| 6,512,899 B2 * | 1/2003 | Shimada et al. | ............... | 399/82 |
| 6,567,628 B1 * | 5/2003 | Guillemin et al. | ............ | 399/82 |
| 6,924,826 B1 * | 8/2005 | Nakagiri et al. | ............ | 358/1.15 |
| 6,950,203 B1 * | 9/2005 | Akabane et al. | ............ | 358/1.15 |
| 6,965,460 B1 * | 11/2005 | Gann et al. | ................. | 358/471 |
| 7,092,963 B2 * | 8/2006 | Ryan et al. | ................. | 707/104.1 |
| 2001/0043365 A1 * | 11/2001 | Kremer et al. | ............ | 358/1.16 |
| 2002/0131065 A1 * | 9/2002 | Sweetland et al. | ......... | 358/1.13 |
| 2002/0181013 A1 * | 12/2002 | Dunlap | ...................... | 358/1.15 |
| 2003/0014446 A1 * | 1/2003 | Simpson et al. | ............ | 707/527 |
| 2003/0086120 A1 * | 5/2003 | Murata | ....................... | 358/1.16 |
| 2003/0197896 A1 * | 10/2003 | Doyle | ......................... | 358/1.18 |
| 2004/0179227 A1 * | 9/2004 | Burkes et al. | .............. | 358/1.15 |
| 2005/0040642 A1 * | 2/2005 | Jiang | ........................... | 283/81 |

* cited by examiner

*Primary Examiner*—Twyler L Haskins
*Assistant Examiner*—Chad Dickerson
(74) *Attorney, Agent, or Firm*—The Noblitt Group, PLLC

(57) ABSTRACT

Methods and apparatus for imaging systems according to various aspects of the present invention provide a system for making physical copies of images and, substantially concurrently, generating electronic images. The imaging system suitably includes a scanner and a control system. The scanner makes copies of the documents or other images and substantially concurrently stores image data corresponding to images. The control system controls the scanning process and/or the handling of the generated images.

70 Claims, 7 Drawing Sheets

METHODS AND APPARATUS FOR IMAGING DOCUMENTS

FIELD OF THE INVENTION

The invention relates to methods and apparatus for imaging documents.

BACKGROUND OF THE INVENTION

Modern electronic and optical data storage systems store vast amounts of information, far more than ever possible using conventional paper and ink. Current storage media such as CD ROMs and DVD ROMs can store on a single thin medium more information than may be contained in a file cabinet full of documents. The information on an electronic or optical medium is also easy to access and organize using databases and search systems.

Nonetheless, paper persists as a common medium. In many cases, the storage and indexing issues associated with paper documents are tolerated in view of paper's familiarity and simplicity. Such documents accumulate over time into large collections of paper and files.

Various circumstances arise, however, that require the documents to be stored, transported, sorted, and/or reviewed, such as in a complex litigation case or document management environment. Converting the paper to opto-electronic form for transport, storage, indexing, and retrieval involves feeding each document through a scanner, which makes an electronic image of the document and stores it. The image may then be withdrawn from data storage at a later time for review, printing, or organization.

Processes for making and organizing images of documents tend to be complex and difficult. Generally, scanning large volumes of documents has required a system administrator or other relatively high-ranking individual to set up a scanning project and assign the project to a scanning operator. The scanning operator, who is ordinarily a trained operator, scans the documents, which creates a series of electronic images of the documents. The administrator then assigns the project to a quality-control operator, who then reviews the images to ensure that they are accurate and complete. Finally, to generate hard copies of the documents, the electronic images may be assigned reference numbers to be inserted into the electronic images, and then printed and reassembled.

Copying processes, though simpler, tend to be cumbersome as well. In a typical copying environment, the operator copies the documents on a copying machine and then reassembles and reviews the copies. To mark the copies with reference numbers, stickers bearing the reference numbers are attached to the documents. The labeled copies are then copied again to make additional copies of the marked set of documents.

Document imaging is rendered even more difficult by the presence of physical organizing elements commonly found in physical filing systems, such as staples, folders, and rubber bands. In many cases, such as litigation matters, preserving the original organization of the documents may be important. Consequently, the process of imaging and copying such documents is often a monumental and expensive task.

SUMMARY OF THE INVENTION

Methods and apparatus for imaging systems according to various aspects of the present invention provide a system for making physical copies of images and generating electronic images. The imaging system suitably includes a scanner and a control system. In one embodiment, the scanner makes copies of the documents or other images and substantially concurrently stores image data corresponding to images. The control system controls the scanning process and/or the handling of the generated images.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention is described partly in terms of functional components and various processing steps. Such functional components and processing steps may be realized by any number of components, operations, and techniques configured to perform the specified functions and achieve the various results. For example, the present invention may employ various elements, materials, data sources, copiers, scanning systems, printing systems, storage systems and media, and the like, which may carry out a variety of functions. In addition, although the invention is described in the document copying and imaging context, the present invention may be practiced in conjunction with any number of applications, environments, scanning and storage processes, document management systems, information transfer systems, and copying systems; the systems described are merely exemplary applications for the invention.

Figure 1:
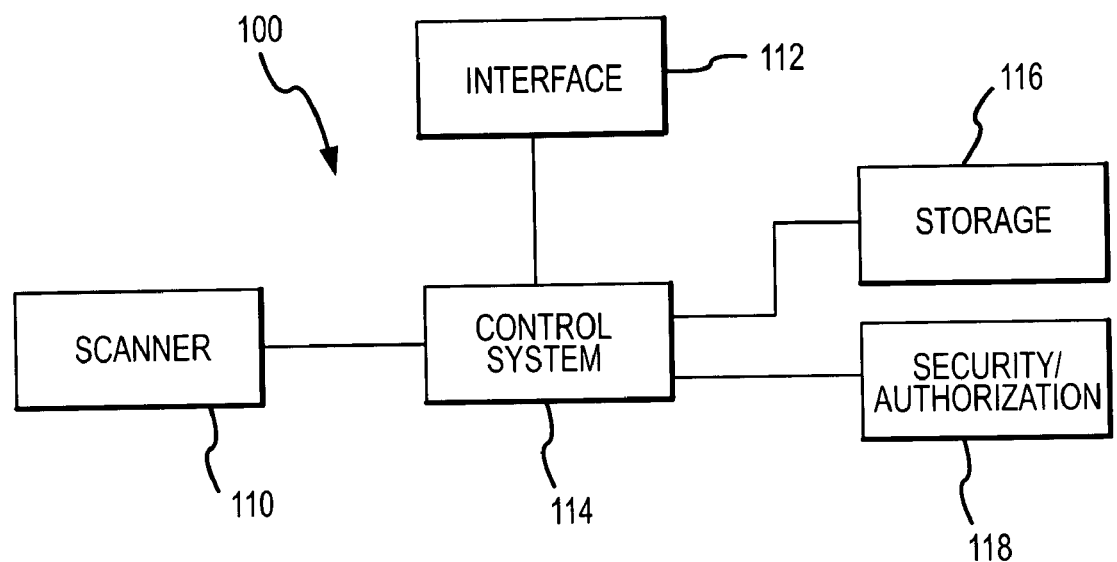
FIG. 1 is a block diagram of an imaging system according to various aspects of the present invention.

Referring to FIG. 1, an imaging system 100 according to various aspects of the present invention comprises a scanner 110; an interface 112; and a control system 114. The scanner 110 generates copies and/or electronic data corresponding to images, such as documents, drawings, photos, and/or medical images. The interface 112 provides a system for communicating with operators or external systems. The control system 114 controls various aspects and operations of the imaging system 100 and generates organizational information associated with the images. The various components of the imaging system, including subcomponents and/or functions of the imaging system 100, may be integrated into a single machine, or may comprise multiple interconnected systems.

The scanner 110 may comprise any suitable system for making electronic data corresponding to the relevant images, such as a conventional document scanner 110, a camera system, or a medical imaging system. For example, the scanner 110 suitably comprises a multi-function device for making copies and electronic image data corresponding to documents and photos. The scanner 110 also may also operate as a printer. In the present embodiment, the scanner 110 comprises a Canon ImageRUNNER 8500 or 105 multi-function device. In alternative embodiments, the scanner may comprise individual components, such as a scanner and a printer individually controlled by the control system 114.

The scanner 110 may be configured in any appropriate manner for the application or environment. For example, the scanner 110 of the present embodiment is configured to interface with communication systems, such as e-mail, I-Fax, FTP, and/or local area networks. The scanner 110 may offer various features for document handling, such as an automatic document feeder (ADF), multiple paper sources, duplexing, stapling, and hole-punching. Further, the scanner 110 may be configured to facilitate substantially simultaneous scan and print operations, and to insert reference numbers or other image keys, such as Bates numbers, into the scanned images. In addition, the scanner 110 is suitably configured to receive control signals from the control system 114, such as an internal control system and/or an external computer system.

The interface 112 facilitates the transfer of information between the imaging system 100 and external systems, such as other machines, operators, or observers. The interface 112 may comprise any suitable system for facilitating the transfer of information. For example, the interface 112 suitably includes an operator interface 112 for providing visual information to the operator and receiving instructions from the operator. The operator interface 112 may comprise any suitable system, such as a conventional monitor, a keyboard, a tracking device, a voice recognition system, a speaker, and/or other suitable system for transmitting and/or receiving information to and from the operator. In the present embodiment, the operator interface 112 comprises a touch screen display that is configured to provide a graphical interface 112 display to the operator and generate signals in response to the operator touching the display. The operator interface 112 may also include a voice recognition system configured to receive verbal information from the operator, such as operational commands.

The interface 112 suitably provides an integrated control interface for communicating with the scanner 110 and/or the control system 114. The imaging system 100 may be configured such that all major functions of the imaging system 100, such as setting up scanning, printing, and/or copying operations, may be accessed and controlled via the interface 112. In addition, the interface 112 is suitably located near the scanner 110 and the control system 114 to present an intuitive relationship with the scanner 110 and the control system 114. In the present embodiment, the interface 112 presents one or more graphical interfaces for providing information to and receiving commands from the operator. The imaging system 100 suitably operates in conjunction with a set of default or preselected parameters, such as default storage locations for electronic images and image formats. The default parameters may be selectively changed, for example via the graphical interfaces presented on the interface 112. In addition, the interface 112 may selectively display the electronic images of the documents, for example to facilitate quality control of the copying and/or imaging process.

The control system 114 suitably controls one or more operations of the imaging system 100. The control system 114 may comprise any suitable system for controlling imaging system 100 operations, and may be configured in any suitable manner. For example, the control system 114 suitably comprises a computer system, such as a personal computer system, connected to the scanner 110 via a parallel cable, a wireless connection, a network, or other suitable mechanism for facilitating the exchange of signals between the scanner 110 and the control system 114. Alternatively, the control system 114 may be configured as an internal computer or controller, such as a computer integrated into the scanner 110 or added as a component, for example via a card connected via a card slot. The control system 114 suitably includes any appropriate resources, such as a processor, a fast memory, a network access card, and a hard drive.

The control system 114 suitably performs various operations to control the operation of the imaging system 100 in conjunction with an imaging system program. For example, the control system 114 suitably executes the imaging system program to control initiation and termination of scanning, printing, merging, deleting, and other operations. The control system 114 also facilitates interfacing with the operator via the interface 112 to control the operation of the imaging system 100 according to the directions of the operator. Further, the control system 114 may be configured to manage the images, such as managing and/or performing optical character recognition (OCR), creating new document collections, merging document collections, automatically purging collections after a selected period or according to other criteria, and database maintenance. The control system 114 may also regulate various other aspects of the imaging system 100 operation, such as access to and by other systems, resource allocation, and/or coordinating operation with other systems.

In the present embodiment, the control system 114 has direct access to a scanning and copy engine in the scanner 110, for example via TWAIN interface or other API, to initiate scans and return image handles to the control system 114, set scan parameters such as simplex/duplex, ADF/flatbed, and papersize, and perform other functions. The control system 114 may also include any suitable drivers for operating the imaging system 100. For example, the present control system 114 operates in conjunction with a PCL5e driver, which may support paper tray and paper size settings, auto-stapling features, raster graphics settings, simplex/duplex control, and starting and stopping print jobs.

The control system 114 is suitably configured to control the scanner 110 to mimic a process for generating copies of documents while concurrently generating electronic images of the documents and storing them in an accessible location. For example, the control system 114 may be configured to receive the documents for copying using a conventional copying process, such as loading the documents into a document feeder or other intake mechanism, and copying the documents in response to pressing a button or other mechanism for starting the copy process. While the scanner 110 makes the physical copies of the documents, the control system 114 may configure the scanner 110 to substantially concurrently generate and store electronic images of the documents. The control system 114 suitably controls the operation of the scanner in conjunction with a set of default or other preselected parameters. Consequently, the operator may make the physical copies and/or electronic images with minimal effort, training, or familiarity with the scanner 110 or control system 114.

The control system 114 may also generate organizational information associated with the images. The organizational information may comprise any suitable information relating to the organization of the images, such as boundary markers for individual documents, beginning and end markers for various binding elements, the identity of various binding elements, the names of folders and boxes, whether the image is a duplex image (i.e., taken from the backside of another page), or other information. The control system 114 may generate the information in any suitable manner, such as by automatically identifying and storing such information from the original documents, or receiving data, such as via the interface 112, relating to the organization of the documents and generating corresponding data. The control system 114 associates the organizational data with the images, for example to record the original organization of the documents.

The imaging system 100 may also include and/or have access to other resources, such as according to the application or environment. For example, the present imaging system 100 includes a storage system 116, such as a local or remote hard drive, a CD ROM and/or DVD burner, or other suitable system. The imaging system 100 may also include a security and authorization system 118 to inhibit access to the imaging system 100 and control authorized access.

In the present system, the security and authorization system 118 includes a counting system implemented by a dongle to facilitate use of the imaging system 100. The dongle counts the number of images generated by the imaging system 100 or tracks other suitable data to determine the use of the system, and locks the imaging system 100 to prevent further use if selected criteria are met, such as exceeding an authorized number of images. The operator may unlock the imaging system 100 for further use by purchasing another dongle or having the dongle reset for an additional number of images.

The imaging system 100 according to various aspects of the present invention is configured to provide various functions and operations to facilitate making copies of documents, generating images, managing images, printing images, and/or exporting images. For example, the control system 114 is configured, such as in conjunction with the imaging program, to control various aspects of the scanner 110 to control the generation and use of the images. The control system 114 may perform these functions to provide greater control and flexibility in image generation and management than may be available using a conventional system, such as the scanner 110 alone. In addition, the functions are suitably presented to the user via graphical user interfaces and/or a voice recognition system that facilitate the simple use of the system.

Figure 7:
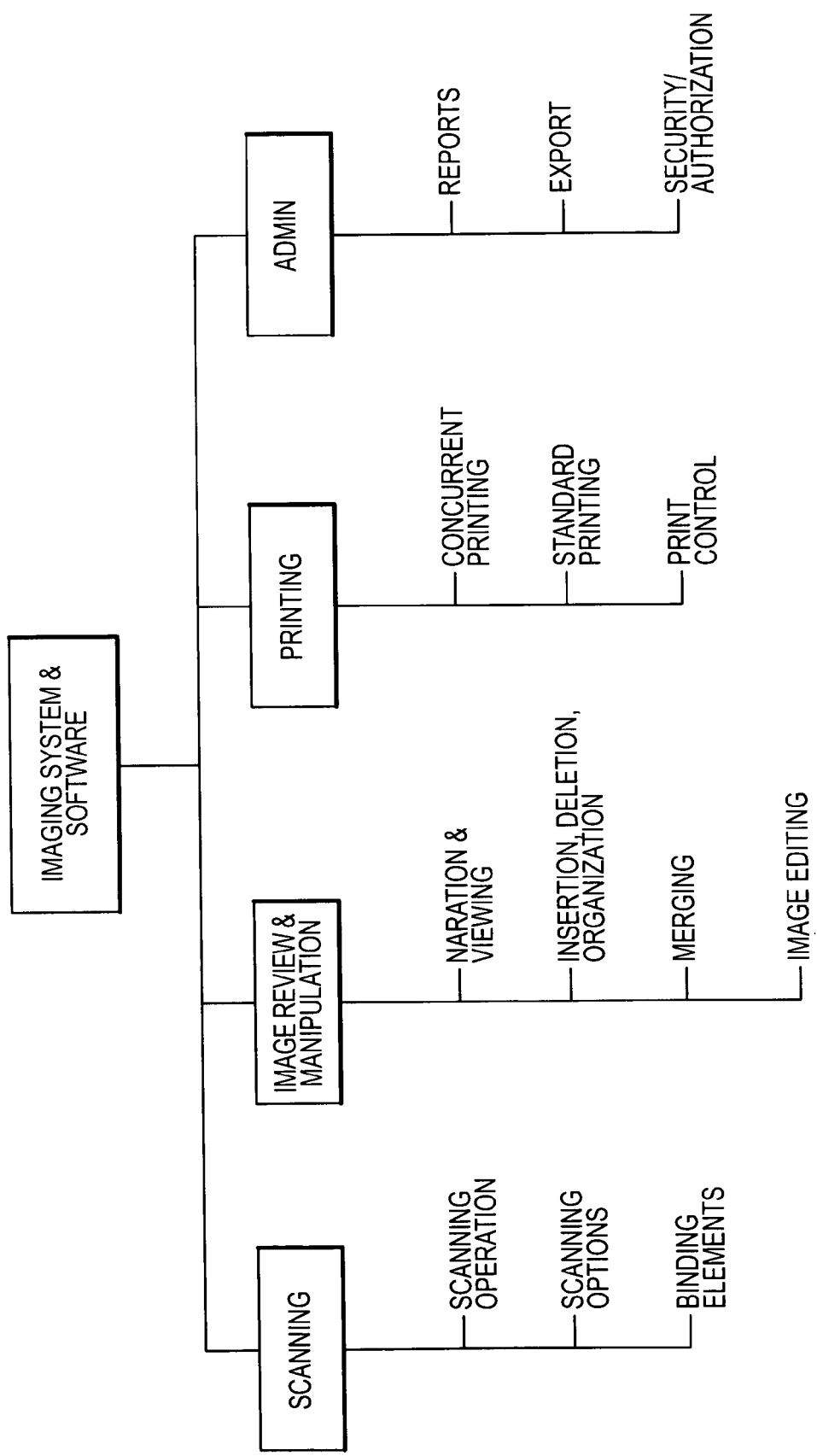
FIG. 7 is a block diagram of various functions performed by the imaging system.

In the present embodiment, the control system 114 provides several functions for the generation and management of the images. Referring to FIG. 7, the control system may provide scanning functions to generate images, image review and manipulation functions for sorting, reviewing, and adjusting the images, printing functions for generating copies of the images, and administrative functions for controlling the overall operation of the system and handling of the documents.

The control system 114 and the imaging program may offer any suitable scanning operations. For example, the scanning operations may include different handling options for documents organized in different ways. In particular, the scanning operations may include scanning processes configured to track the beginning and ending pages of a particular document. The scanning operations may include a scanning operation dedicated to documents held together by staples, which are the most common binding element. The scanning operations may also provide a binding element process for recognizing the use of various other binding elements. The present system, for example, records the type of binding element used and its position relative to the images. The scanning operations may further include various additional options for controlling the imaging process.

The image manipulation and review functions allow the generated images to be reviewed, sorted, adjusted, and/or edited. The image manipulation and review functions may be used at the position of the scanner or remotely, such as on a remote computer having access to the generated images. The image manipulation and review functions may be used for any suitable purpose, such as to perform quality control to ensure that the images are identical to the original documents and correct any deficiencies. The image manipulation and review functions may include, for example, image navigation functions to find selected images, insertion, deletion, and organization functions for changing the document collection, and image editing functions for adjusting various aspects of the images, such as contrast, despeckling, rotation, margins, and clipping.

The control system 114 may also operate in conjunction with the imaging system software to perform printing and exporting functions. The printing functions may comprise any suitable set of functions for generating printed images, such as concurrent printing while scanning and conventional print functions such as standard printing and control functions. The control system 114 and the imaging software may also support administrative functions, including exporting data for transferring data to other systems or media, generating reports, and controlling security and authorization.

More particularly, the imaging system 100 of the present system is suitably configured to generate, store, and/or process the image data in any suitable manner and according to any appropriate techniques. In the present embodiment, the imaging system 100 and the imaging system program are configured to generate the images in accordance with a process that resembles a copying process, but produces electronic images of the documents for review, transfer, or other processing. Further, the imaging system 100 may be configured to print, store, perform OCR, or otherwise manage and handle the images. In the present embodiment, the imaging system may be configured to print the images along with various data to note the original organization and binding components of the documents.

Figure 2:
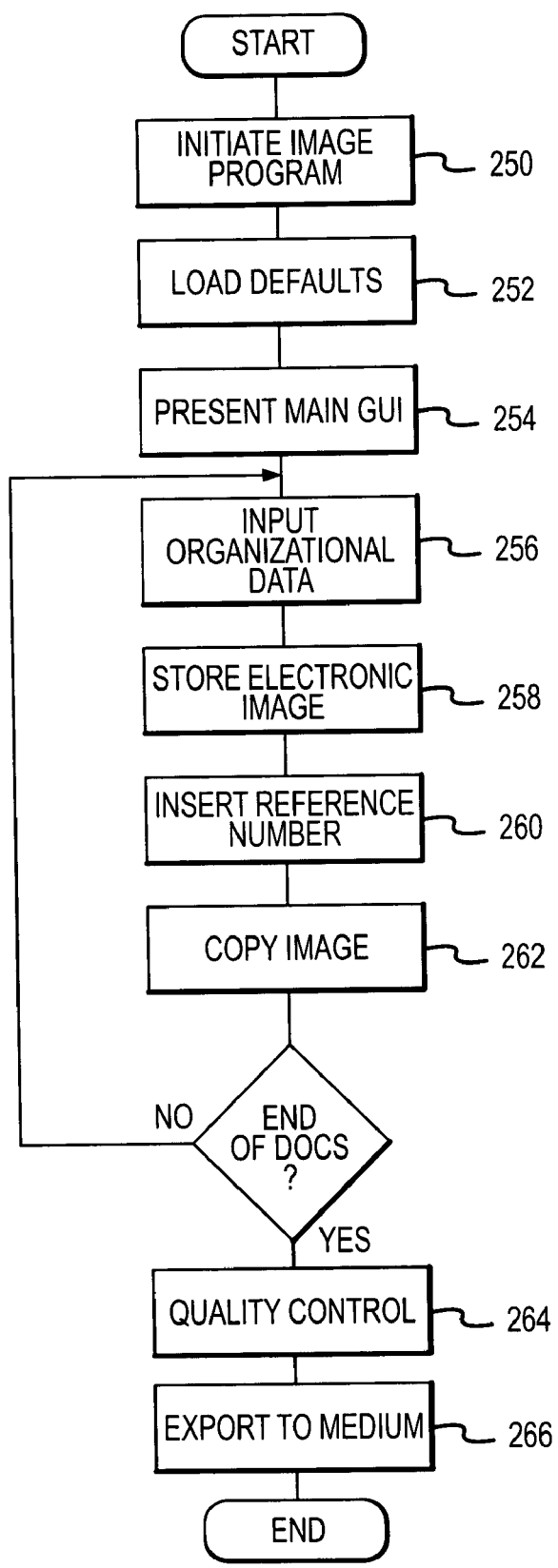
FIG. 2 is a flow diagram of a process for making images.
Figure 3:
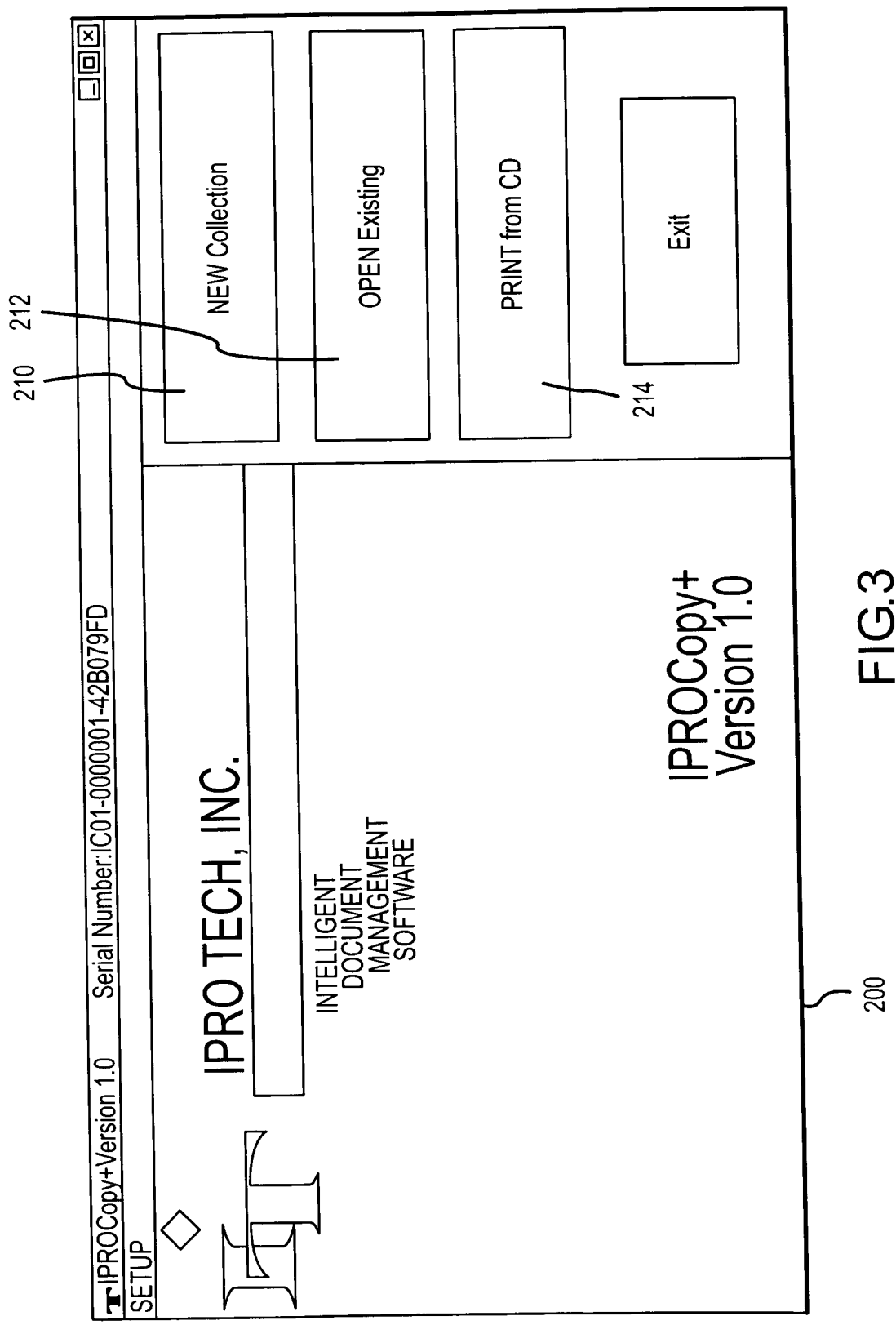
FIG. 3 is an interface display for an initial display.

In particular, referring to FIG. 2, the control system 114 of the present embodiment initiates the imaging program (250), which loads one or more default parameters for operation of the imaging system (252). For example, the imaging program may load a default location for storing electronic images, configure the scanner 110 to generate physical copies of documents and electronic images, and various other default parameters for operating the imaging system 110. The imaging program may then prompt the user via the interface 112 to either enter the name of a new document collection or open an existing document collection. For example, referring to FIG. 3, the control system 114 presents an initial GUI 200 to the operator via the interface 112. The initial GUI 200 provides multiple processes from which the operator may select, such as starting a new document collection 210, opening an existing document collection 212, or printing from a storage medium 214. In the present system, a document collection may comprise any appropriate group of materials to be imaged, such as a box of documents, a set of records for a particular individual or entity, electronic data from a CD ROM or DVD, or other suitable grouping.

Figure 4:
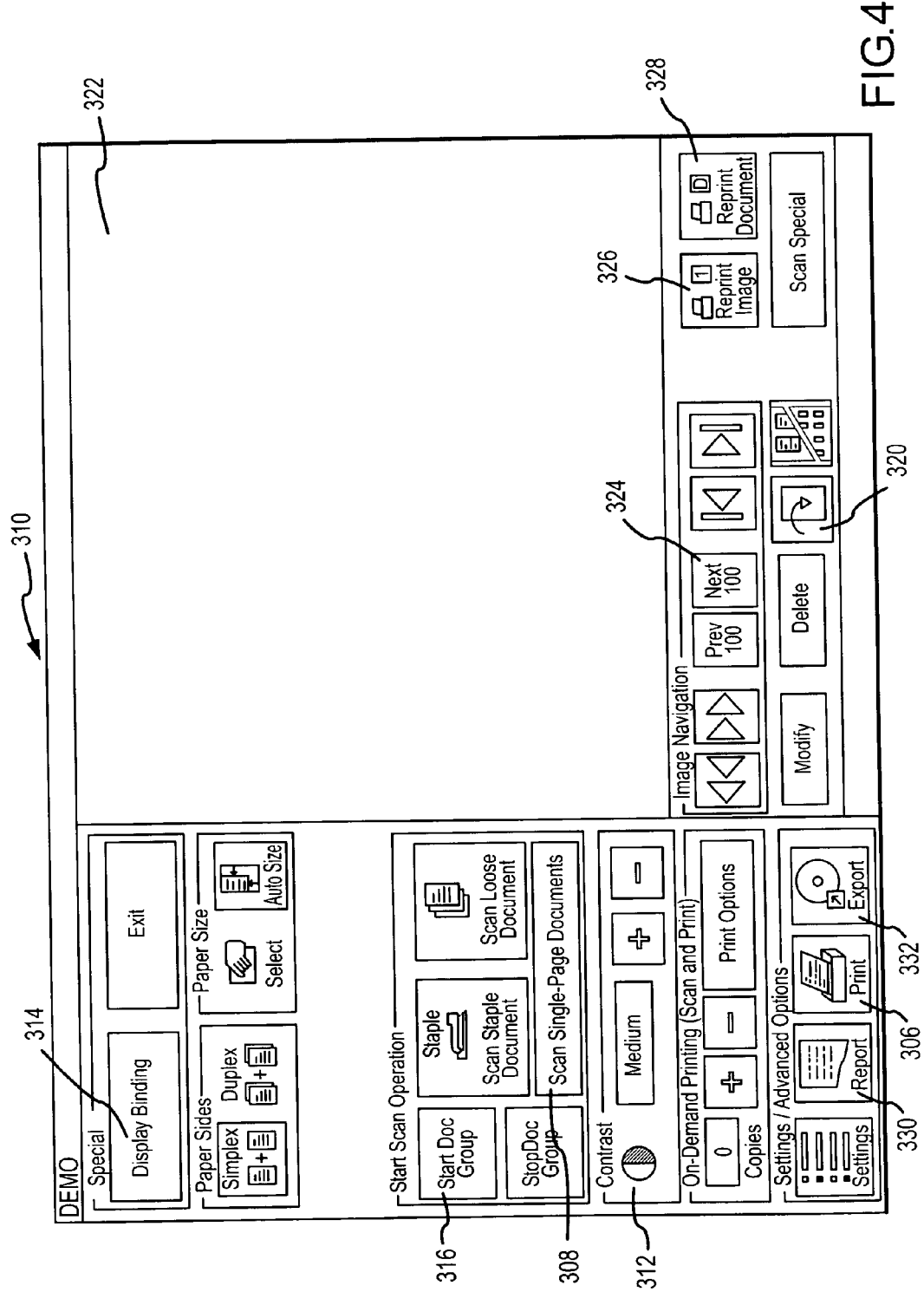
FIG. 4 is an interface display for a main display.

To initiate generating or manipulating image data, the operator selects to begin a new collection or identifies an existing collection to access, for example by selecting an appropriate button on a touch screen, typing the relevant information via the keyboard, or verbally commanding the control system 114 via a voice recognition system. After establishing the relevant document collection, the control system 114 facilitates various operations for the document collection, such as to review, print, modify, delete, add images to, export, perform OCR, or otherwise manipulate the document collection or portions of the document collection. For example, referring to FIGS. 2 and 4, the control system 114 suitably presents a main GUI 310 on the interface 112 (254). The main GUI 310 provides one or more options for selection by the operator. The operator may designate a selection to proceed with operations for the current document collection. The operator may perform several operations from the main GUI 310, including scanning, image review and manipulation, and printing operations. The operator may provide commands and other information via the interface 112, for example by selecting options from a touch screen, typing information on a keyboard, and/or speaking commands via a voice recognition system.

To copy or otherwise process a set of documents, the operator may select one of various operations for scanning a document in a document collection. A document may comprise any suitable item for imaging, such as a document comprising one or more pages or one or more pages of drawings. To initiate the scanning process, the operator may, if desired, initially adjust various scanning parameters, such as by using a contrast adjustment panel 312 on the main GUI 310 or changing various other settings, or use a set of default parameters. The operator may also enter various organizational information relating to the set of documents (256). For example, to indicate the beginning of the document, the operator selects a suitable option from the main GUI 310, such as by tapping the DISPLAY BINDING button (or speaking a corresponding phrase) if the document is bound with a binding element or the START DOC GROUP button (or phrase) if the document is part of a different type of document group, such as a group of pages having different sizes.

Figure 5:
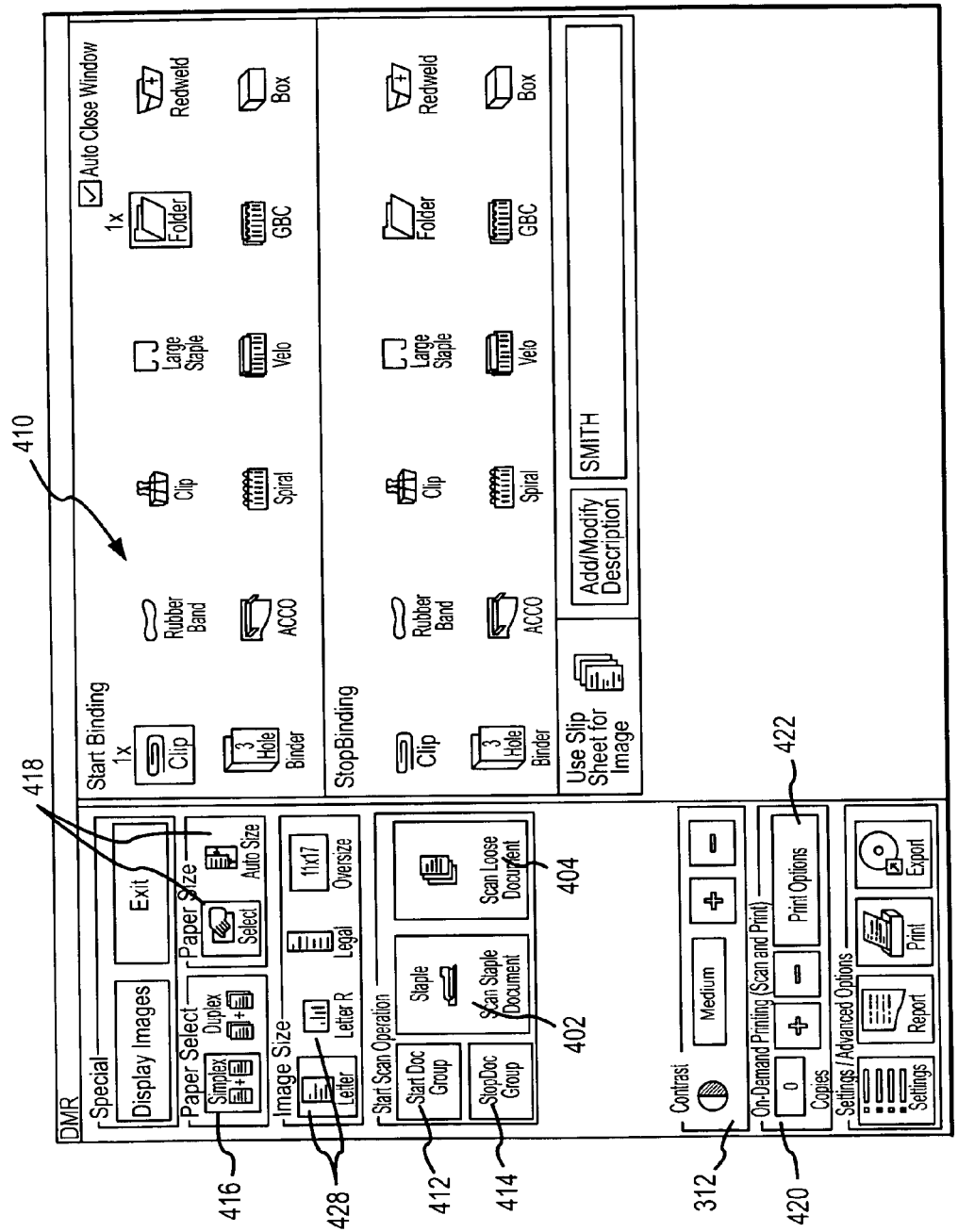
FIG. 5 is an interface display for a main display including a binding elements display.

If the DISPLAY BINDING option is selected, the control system 114 initiates a binding elements system for identifying the binding elements associated with a document. The binding elements system may comprise any suitable system and/or process for identifying binding elements relating to a document or group of documents. Binding elements may comprise any suitable organizational elements found in a document collection, such as paper clips, staples, folders, three-ring binders, boxes, dividers, rubber bands, prong fasteners, and spirals. In the present embodiment, the binding element system includes a binding elements display 410 (FIG. 5) for identifying binding elements for the documents. The binding elements display 410 provides one or more binding element selections that may be selected to indicate the position of the binding element with respect to the document. In addition, the binding elements display 410 may allow identification of the type of binding element.

For example, the binding elements display 410 may present multiple touch screen buttons and/or verbal command options corresponding to different types of binding elements, such as staples, paper clips, rubber bands, folders, or other mechanisms for organizing pages. The present binding elements display 410 is separated into a Start Binding portion and a Stop Binding portion to allow the operator to indicate where the relevant binding elements begin and end with respect to the document. The binding elements display 410 is suitably presented in conjunction with at least a portion of the main GUI 310 to facilitate efficient selection of binding elements and initiation of scanning operations.

To scan the document, the operator selects the appropriate type and number of binding elements for the document. The operator may then remove the actual binding elements from the document. For example, a folder may contain two documents, the first of which is stapled and the second held together by a paper clip, in which case the operator removes the first document from the folder, removes the staple, and selects the FOLDER button on the Start Binding portion of the binding element display 410, or says "START FOLDER" to the voice recognition system. The operator may also enter a description, such as a label on the folder, by selecting the ADD/MODIFY DESCRIPTION button or saying "ADD DESCRIPTION" and providing the desired description.

The operator may then place the pages to be scanned in the scanner 110, such as in the ADF, and select a scanning button or verbally initiates a scan. The scanning operation may vary according to the type of documents to be scanned. In the present embodiment, the control system provides a SCAN STAPLE DOCUMENT option 402, a SCAN LOOSE DOCUMENT option 404, and a SCAN SINGLE PAGE DOCUMENTS option 308 (FIG. 3), each of which operates to generate image data corresponding to the content of the document and note various characteristics relating to the document, such as the position and/or type of binding elements or whether the image is the duplex side of another image.

When the scan operation is initiated, the scanner 110 retrieves the documents from the ADF or other source and generates an electronic image of the document (258). The electronic image may comprise any suitable data corresponding to the image in any suitable format, such as bitmap, .jpeg, .tiff, or other format. In the present embodiment, the electronic image is stored in a proprietary format suitable for storage on electronic media and readable by a proprietary reader program.

The control system 114 generates organizational data for the document and associates the information with the document, such as by marking the individual images with flags relating to the image's position in a document or relative to a binding element. In the present embodiment, the control system 114 sets document boundary flags for images corresponding to the first and last pages of the document, as well as binding element flags for the pages at the beginning and end of a binding element. For example, the control system 114 may generate flags indicating that the first image corresponds to the first page in a paper-clipped set of documents, the first page in a folder of documents, and the first page of a document. In addition, the control system 114 may provide a proposed image key or other reference number to the operator, for example for cataloguing the documents. The user may accept the number, decline to start the numbering at all, or change the starting number.

Upon acceptance of the reference number, the control system 114 inserts the reference number into the electronic image (260). Unless otherwise configured, the control system 114 also causes the scanner to generate a copy of the document (262) with the reference number inserted in the image. Thus, the scanner suitably generates the electronic image and the copy substantially concurrently.

The organizational information may be designated and stored in any suitable manner. For example, in the present example involving the now unstapled first document, the operator taps the SCAN STAPLE DOCUMENT button 402 or says "scan staple document" for the voice recognition system. In response, the control system 114 initiates scanning of the documents in the ADF and automatically generates electronic indicators corresponding to the beginning and end of the document and the use of staples. The control system 114 of the present embodiment suitably generates a document boundary flag associated with the first page of the document indicating that the page marks the beginning of the document and a staple start flag indicating that the associated page is the first page in a stapled set of documents. Upon encountering the last page in the document, the control system 114 may generate one or more flags associated with the last page indicating that the page is the last page in the document and the last page in a stapled set of documents.

If the documents are held together by a different binding element, such as a paper clip, rubber band, a folder, or the like, the operator may select the SCAN LOOSE DOCUMENT option via a button 404 and/or verbal command. In this case, the operator identifies the type of binding element using the binding elements display 410 or verbal command, places the document in the scanner 110, and selects the SCAN LOOSE DOCUMENT option. The control system 114 begins scanning the documents and generates flags corresponding to the beginning of the document and the relevant binding elements. The control system 114 may generate document boundary flags for the first and last pages in the document and binding element flags for the first and last pages associated with the binding element.

Thus, in the present example involving the second, paper clipped document in the folder, the operator unclips the document and places it in the scanner. The operator selects the CLIP button from the Start Binding portion of the binding elements display 410 and selects the SCAN LOOSE DOCUMENT button 404, or provides corresponding verbal commands to the voice recognition system in the interface 112. The control system 114 initiates the scanning process and generates the document boundary flags associated with the first and last pages of the document and a Start Paper Clip flag associated with the first page of the document. When the documents have been scanned, the operator selects the CLIP button and the FOLDER button from the Stop Binding portion of the binding elements display 410 or provides corresponding verbal commands, and the control system 114 generates corresponding flags associated with the last page of the document.

If the relevant document comprises a single page, the operator exits the binding elements display 410 and selects the SCAN SINGLE-PAGE DOCUMENTS button 308 or performs a verbal command. The control system 114 automatically sets flags indicating the start and end of the document for the same page, or a single-page document indicator.

When the images have been scanned and copied, the documents may be retrieved from the scanner 110. The operator may then reattach the relevant binding element to return the document to its original form. The operator may then repeat the process for the next document. While entering the information for the next document, the operator suitably indicates the end of the previous binding elements as well by selecting the appropriate buttons from the Stop Binding portion of the binding elements display 410 or providing the appropriate verbal cues. For example, if the next document is a single page document after the folder in the preceding example, the operator selects the CLIP button and the FOLDER button from the Stop Binding area of the binding elements display 410 and selects the SCAN SINGLE-PAGE DOCUMENTS button 308, or in a system having a voice recognition system, provides corresponding verbal commands. The control system 114 stores a flag indicating that the preceding image corresponds to the end of the clipped pages and the end of the folder, and another flag indicating that the current page is a single-page document.

The control system 114 may also be configured to disable the function that automatically places document boundary flags at the beginning and end of the documents provided to the scanner. For example, a document may comprise different size pages, some of which cannot be scanned through the ADF. Consequently, the operator may manually or verbally designate the beginning and end of the document, for example using a START DOC GROUP button 412 and a STOP DOC GROUP button 414 (FIG. 4) to identify the beginning and end boundaries of a document, or appropriate verbal commands. For example, the operator may tap the START DOC GROUP button 412 or say "start group" to indicate the beginning of a document group, remove the binding elements, indicate the types of binding elements via the binding elements display, and indicate a description, if desired.

The control system 114 stores a flag for the first image, indicating that the image is the first image in the document group, along with any appropriate flags relating to binding elements. Items to be copied may then be imaged, for example via the ADF and/or the flatbed using the appropriate scanning operations, such as the SCAN STAPLE DOCUMENT, SCAN LOOSE DOCUMENT, or the SCAN SINGLE-PAGE DOCUMENT buttons or commands. The operator may then accept or change the image keys and reassemble the original documents into their original form with the original binding elements. Upon completion of the document group, the operator may tap the STOP DOC GROUP button 414 or provide a corresponding verbal command to indicate the end of the group. The control system 114 responds by storing an indicator that the preceding image corresponds to the end of the group.

The control system 114 may offer any other appropriate options for making the physical copies and/or electronic images. For example, the main GUI 310 may include simplex/duplex buttons 416 and/or voice command responses for scanning simplex or duplex documents. The main GUI 310 may also include one or more paper sizing buttons 418 and image sizing buttons 428 and/or corresponding verbal commands for manually or automatically selecting the paper size and image size for the image. Other options may include contrast options 312 for adjusting the darkness or lightness of the image, and print options on a print panel 420 for simultaneously printing one or more copies of the images as they are generated by the scanner 110. Additional imaging enhancement features may be accessed via a Print Options button 422, which suitably opens a window for further imaging options, such as adjusting clipping values, margins, despeckling, and blank page detection thresholds.

The imaging system 100 may be further configured to facilitate quality control (264), for example by electronic review of the generated images. The imaging system 100 may be configured in any suitable manner to facilitate review of electronic images, such as via the interface 112 or a remote station. In the present embodiment, the images may be reviewed via any system, such as the interface 112 or a remote computer having access to a network to which the scanner 110 and/or the control system 114 is directly or indirectly connected. The images may be reviewed at any time, such as during generation or after full or partial completion of a document collection. Thus, images may be reviewed concurrently with the imaging process or at a later time, such as while the scanner 110 is unavailable.

In the present embodiment, the computer system for reviewing the images executes an image review program, which is suitably integrated into the imaging system program. For example, the main GUI 310 is suitably configured to include options for reviewing and manipulating images that have already been generated. The options may include functions for any suitable purpose, such as reviewing the images for content, performing quality control or other manipulation of the images, preparing indexes or databases for the images, despeckling, or any other suitable process.

In the present embodiment, the main GUI 310 includes options for finding and reviewing various images. Referring again to FIG. 3, the main GUI 310 may include a FIND IMAGE button 320, which opens a dialog box to allow the operator to enter identifying or search information for a particular image. The main GUI 310 also includes one or more image navigation buttons 324 for browsing the images. In the present embodiment, the navigation buttons 324 include forward and reverse buttons for browsing through the images, such as in increments or decrements of eight, one hundred, or other appropriate number. The navigation buttons 324 also include buttons for going to the first image in the collection and the last image in the collection. The navigation functions may also be implemented via verbal commands.

Figure 6:
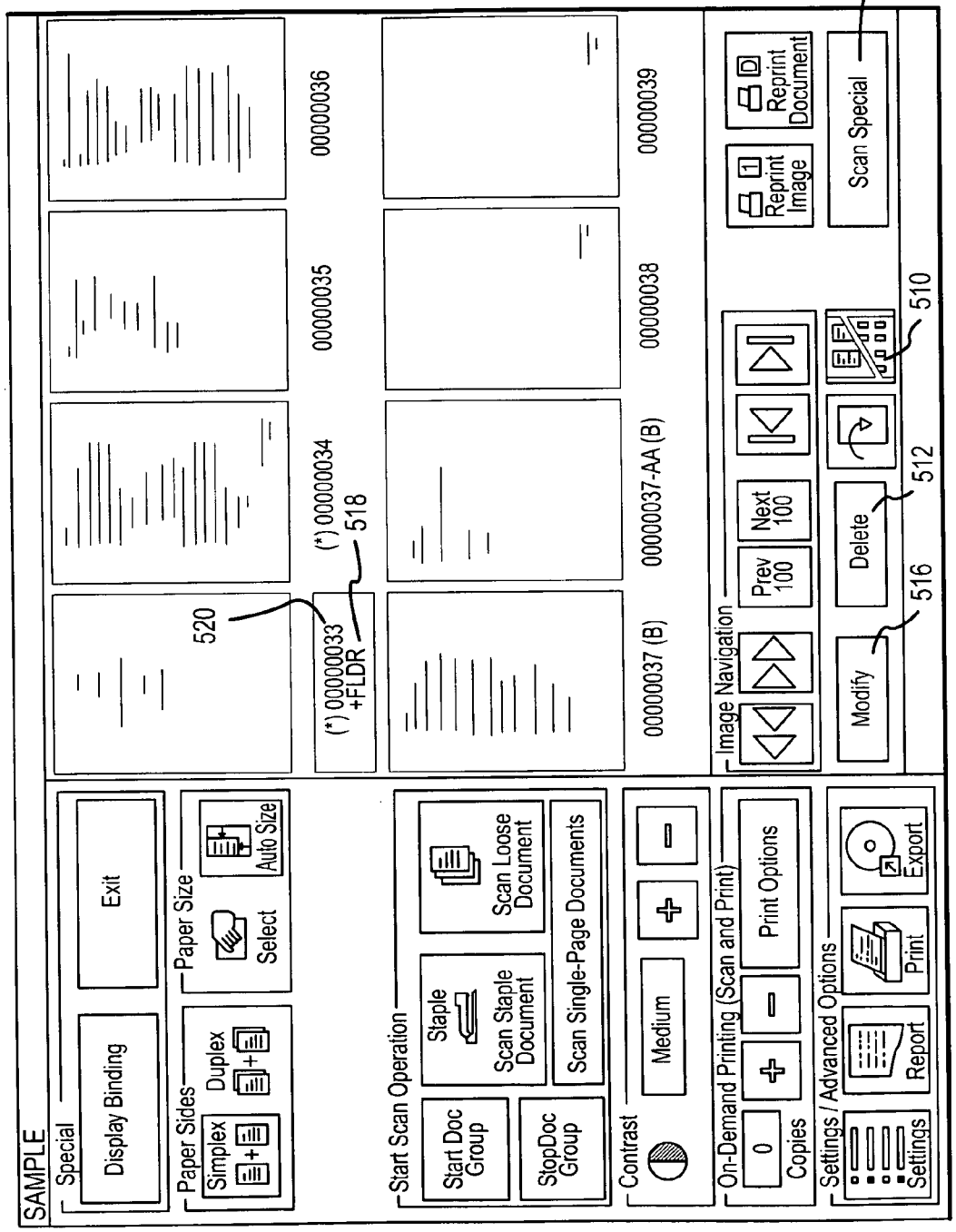
FIG. 6 is an interface display for a main display including thumbnails of images.

When navigating through the images, the control system 114 suitably retrieves images from the memory and provides them to the user in an image review area 322. A preselected number of images may be presented at a time, such as eight thumbnail versions of the images (FIG. 6). If the operator wishes to enlarge one image, the operator selects the image, such as by double-tapping the thumbnail of the image, and the control system 114 presents an enlarged version of the single image. If the operator wishes to view two images at a time, the operator may designate the first image to be viewed by selecting it, then selecting a THUMBNAIL toggling button 510. The control system 114 switches the view to present only two larger images, the image designated and the next image. In the dual-image mode, the navigation buttons may have different operations, such as to navigate by one- or two-image increments. The operator may return to the eight thumbnail images from either the single-image view or the dual-image view by tapping the THUMBNAIL toggling button 510.

The control system 114 may also be configured to facilitate the insertion, deletion, and modification of the images. For example, the operator may designate a particular image and tap the DELETE button 512. In the present embodiment, the control system 114 generates a DELETION window, which offers various deletion selections, such as to delete the designated image, to delete the entire document of which the image is a part, to delete the image and insert a placeholder, such as text like "This page intentionally left blank", or to identify a range of images to be deleted.

Conversely, the control system 114 may facilitate the insertion of images into a document or document collection. For example, in the present embodiment, the operator suitably selects an initial image and indicates whether the images to be inserted are simplex or duplex images. The operator may then select the SCAN SPECIAL button 514, which opens a dialog box offering one or more image insertion options. The insertion options may comprise, for example, adding a missing duplex side to a document, inserting additional pages before or after the selected document, or rescanning the selected image or range of images. The operator may then provide the documents to be imaged, such as on the flatbed or in the ADF, and taps the desired scanning option button. The scanner 110 then generates images corresponding to the documents and the control system 114 inserts them into the set of documents according to the scanning option selected.

In addition, the control system 114 may add a suffix to the image key for the added documents. For example, if an image is added, the control system 114 may assign a suffix to a relevant image key to identify the added document's position in the sequence of documents. The suffix may comprise any suitable designator, such as a conventional alphanumeric suffix having one to three characters. Thus, an image added after image 203 may be assigned an image key of 203-AA. The control system 114 may also generate relevant flags, for example to designate whether the image is associated with a binding element, a document boundary, or the duplex side of another image.

The control system 114 may also facilitate renumbering of the image keys or other reference numbers, for example to eliminate suffixes, change numbering formats, or adjusting starting numbers. For example, the main GUI 310 suitably includes a MODIFY button 516, which opens a dialog box offering various modification options. Selecting a RENUMBER ENTIRE COLLECTION option causes the current collection to be renumbered, thus eliminated any suffixes. The MODIFY options may include other options, such as a ROTATE CURRENT IMAGE 180 DEGREES, which rotates an image that may have been scanned upside down.

The MODIFY options may also include options for changing document flags and binding element designations. The document flags may be represented in any suitable manner to indicate the corresponding document boundaries, binding elements, and other characteristics. In the present system, symbols 518 are presented alongside the image keys 520 when the images are being reviewed. Different symbols may designate, for example, document boundary flags, staples, duplex sides of documents, and binding elements. Additional symbols may be used to identify additional characteristics, such as whether a binding element symbol indicates the beginning or the end of the bound materials.

After selecting an image, the operator may select the MODIFY button 516 and select a SET/REMOVE DOCUMENT FLAG ON CURRENT IMAGE option. Upon selection, the control system 114 suitably offers a subsequent dialog box offering additional options, such as SET LOOSE DOCUMENT FLAG, SET STAPLE DOCUMENT FLAG, and REMOVE DOCUMENT FLAG. Similarly, after selecting the MODIFY button, the operator may select SET/REMOVE BACKSIDE FLAG ON CURRENT IMAGE to adjust the status of the duplex side flag.

Further, the operator may select a MODIFY BINDING ELEMENTS option after selecting the MODIFY button. If the selected document has a document boundary flag, the control system 114 may open a window to modify the binding elements, which suitably includes the selection of possible binding types from which the operator may select. If the document does not have a document boundary flag, a different window opens, allowing the operator to either set a loose document flag or a staple document flag. In addition, the operator may select an ADD/MODIFY DESCRIPTION button to add or modify a description of corresponding to a document flag and/or a binding element.

The imaging system 100 may also be configured to facilitate printing of portions of or the entire document collection, and suitably offers various printing options and features. For example, the scanner 110 suitably includes a printer for printing information in accordance with signals from any suitable source, such as the control system 114, other scanner 110 components, or the network. The printer may be configured as a physically separate device connected to other components of the imaging system 100 or may be integrated into the scanner 110, such as in an MFD.

The printer may be configured to provide any suitable print options. For example, as previously indicated, the printer may be configured to selectively print one or more copies of the images as they are being scanned. To turn off the printing function or change the number of copies printed, the operator may change the number of copies via a print panel 420 on the main GUI 310. The concurrent printing option may be turned off by setting the number of copies to zero.

To print images that were previously scanned, the operator may request access to an existing collection, either stored locally, on a storage medium, or at a remote location, and initiate a print operation by tapping a PRINT button 306. In response, the control system 114 may provide a dialog with an array of print options, such as number of copies, paper selection, and range of images to print. The printer may also print individual images or documents by navigating to and selecting the image and tapping the REPRINT IMAGE button 326 or REPRINT DOCUMENT button 328.

The printer may also facilitate changing various other options. For example, in the present embodiment, the operator may tap the PRINT OPTIONS button on the print panel 420 to open a dialog window for various functions, such as paper tray configuration, simplex/duplex printing, number of copies, whether to print an image, a document, a range of documents, or an entire group, whether to print the image key on the document, and/or image key options, such as image key placement on the document, font, size, and color. Additional printing options may be accessed, such as to facilitate insertion of messages, like CONFIDENTIAL, into images. Other options may include clipping values to control black lines printed around an image, margins (for example to allow space for hole-punching), printer page framing options, image scaling, and other suitable print options.

In addition, the printer may be configured to print the copies in selected pages sizes, such as matching the size of the original or adjusting the image to fit on a selected page size. The printer may also be configured to insert slip sheets, such as colored paper or other marker, at selected positions in the documents, such as between documents or to signify binding elements. The particular type of binding element or other information, such as information corresponding to the document flags, may be printed on the slip sheet. For example, a slip sheet may indicate that a paper clip begins on a next page and another slip sheet may indicate that the paper clip ends on a preceding page. The control system may also use the document flags to generate copies of the original documents, such as by printing duplex side images on the backside of a copy, stapling documents where the originals were stapled, and indicating the proper placement of other binding elements.

The control system 114 may also be configured to provide reports relating to scanning and printing operations. The reports may comprise any suitable reports that may be useful in the particular application or environment. For example, the control system 114 may provide a REPORT button 330 on the main GUI 310 that accesses one or more report options, such as a Box Summary report or a Full Detail Manifest Report. The Box Summary report may give an abbreviated report relating to a particular document collection, such as providing image keys and names of folders in the collection, along with general information such as page count, document count, folder count, number of gaps, and range of image keys for the collection. The Full Detail Manifest Report suitably provides a more detailed report, such as providing indications of binding element starts and stops, folder names, loose and/or stapled document image key ranges, number of pages in each document set, image key range gaps, page count, document count, folder count, and range of image keys.

The control system 114 may also provide various administrative functions for managing the images, such as storage, exporting, database management and repair, and merging document collections. For example, the present control system 114 provides an EXPORT button 332 on the main GUI 310 that opens a dialog window allowing the operator to select from various export options, such as burning to CD ROM, burning to DVD, and creating export files. When the selection is made, the control system 114 transfers the relevant information to the selected storage device for creating the exported files (266). In addition, the control system 114 may store other programs or data, such as a proprietary or other viewing program or an OCR program, on the storage medium for viewing or processing the document image data. Consequently, a recipient of the DVD, CD ROM, or other storage medium may view the documents by loading the viewer software from the same medium.

The document collection may also be exported to files for transfer to another system or entity for additional processing. For example, the control system 114 may export the documents to a file, and then electronically transfer the file to a third party. The third party may perform various tasks relating to the documents, such as performing OCR on the documents or generating indexes for the documents. The third party may then transfer the results of such operations back to the imaging system 100, which may then export the document collection and all associated information to another medium. As a result, a CD ROM or DVD may contain the images of the document collection, a document viewer, an OCR file having OCR data for the document images, and an index or database for facilitating use of the documents.

The control system 114 may also facilitate merging multiple document collections, such as collections of images generated by different imaging stations. For example, to maximize throughput, multiple imaging systems 100 may handle a single imaging job, generating multiple document collections that relate to the same job. To merge the multiple collections into a single collection, the main GUI 310 suitably includes a MERGE COLLECTIONS button. Upon selection of the MERGE COLLECTIONS button, a list of accessible collections is presented, such as collections stored on the network, on the imaging system 100, or on other connected imaging system 100s. The operator may then select the document collections for merging and a starting image key or other designation for the merged document collection. The control system 114 then processes the merge by creating a single document collection for all of the images in the designated collections. The images are suitably renumbered using the selected starting image key.

The control system 114 may offer various other utilities for managing the imaging system 100. For example, the present imaging system 100 facilitates database repair for designated databases and automatic and/or manual purging of document collections, for example following a selected number of days, from the imaging system 100's storage. In addition, the utilities allow collections to be selectively exempted from automatic purging.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/ or physical couplings between the various elements. Many alternative or additional functional relationships or physical connections may be present in a practical system.

The present invention has been described above with reference to a preferred embodiment. However, changes and modifications may be made to the preferred embodiment without departing from the scope of the present invention. These and other changes or modifications are intended to be included within the scope of the present invention.

The invention claimed is:

1. A system for making images of multiple groups of documents by a user, comprising:
 a multi-function device configured to substantially concurrently:
  generate electronic images of the multiple groups of documents; and
  print copies of the multiple groups of documents;
 a control system connected to the multi-function device, wherein the control system is configured to store the electronic images and a set of binding information for the multiple groups of documents as a digital representation of the multiple groups of documents in a long-term memory concurrently with the generation of the electronic images wherein the set of binding information includes:
  a sequence location of a binding element for each group of documents; and
  a type of the binding element associated with each group of documents; and
 an interface linked to the multi-function device and the control system, wherein the interface is configured to allow the user during the generation of the electronic images for the multiple groups of documents to sequentially:
  enter a beginning sequence location and type of binding element for the binding element of a first group of documents prior to the generation of the electronic images for the first group of documents, wherein the type of binding element is selected along with a presented selection of document scanning options that correspond to a desired binding element, wherein the document scanning options comprise:
   a scan stapled document option to correlate a scanned document with a staple as the binding element; and
   a scan loose document option to correlate a scanned document with a second type of binding clement;
  enter an ending sequence location for the binding clement of the first group of documents after the electronic images for the first group of documents have been generated;
  enter a beginning sequence location and type of binding element for the binding element of a second group of documents prior to the generation of the electronic images for the second group of documents, wherein the type of binding element is selected from the presented selection of a document scanning options; and
  enter an ending sequence location for the binding element of the second group of documents after the electronic images for the second group of documents have been generated.

2. A system for making images according to claim 1, wherein the multi-function device is configured to generate and store the electronic images in accordance with a preselected set of default parameters, wherein the default parameters include a default storage location in the long-term memory.

3. A system for making images according to claim 2, wherein the interface is further configured to facilitate changing the storage location and initiate the generation of the electronic images.

4. A system for making images according to claim 1, wherein the interface is further configured to display multiple binding element types for selection.

5. A system for making images according to claim 1, wherein the interface comprises a voice recognition system.

6. A system for making images according to claim 1, wherein. the interface is further configured to:
 present the electronic images for review; and
 initiate the generation of the electronic images.

7. A system for making images according to claim 1, wherein the control system is configured to automatically generate and insert reference numbers into the electronic images.

8. A system for making images according to claim 7, wherein the control system is configured to insert the reference numbers into each electronic image before printing the copy of the document; and the reference numbers are included in the physical copies.

9. A system for making images according to claim 1, further comprising a recording system connected to the multi-function device, wherein the recording system is configured to record the electronic images on a medium and store a viewer program on the medium.

10. A system for making images according to claim 9, wherein:
 the multi-function device generates the electronic images in an initial format; and
 the recording system copies the electronic images onto the medium in the initial format.

11. A method of making images of a collection of documents, comprising:
 generating electronic images of the collection of documents;
 entering organizational data and binding information for the collection of documents while the electronic images arc being generated, comprising:
  indicating a start to the collection of documents;
  entering a beginning sequence location and type of binding element for a first binding element prior to the generation of a first group of one or more electronic images from within the collection of documents, wherein the type of binding element is selected along with a presented selection of document scanning options that correspond to a desired binding element, wherein the document scanning options comprise:
   a scan stapled document option to correlate a scanned document with a staple as the binding element; and
   a scan loose document option to correlate a scanned document with a second type of binding element;
  entering an ending sequence location for the first binding clement after the generation of the first group of one or more electronic images;
  entering a beginning sequence location and type of binding element for a second binding element prior to the generation of a second group of one or more electronic images from within the collection of documents, wherein the type of binding element is selected from the presented selection of a document scanning options;
  entering all ending sequence location for the second binding element after the generation of the second group of one or more electronic images; and
  indicating an end to the collection of documents;
  wherein the organizational data relates the binding information for each group of one or more electronic images to a sequence location within the collection of documents;
 storing the binding information pertaining to the collection of documents in a long-term memory concurrently with the generation of the electronic images of the documents;

storing the organizational data to the long term memory concurrently with the generation of the electronic images of the documents;

storing the electronic images in the long-term memory; and making a physical copy of the documents substantially concurrently with the generation of the electronic images of the documents.

12. A method of making images of documents according to claim 11, further comprising receiving verbal commands regarding the images via a voice recognition system.

13. A method of making images of documents according to claim 11, wherein the storage location comprises a selectively changeable default storage location.

14. A method of making images of documents according to claim 13, wherein; the default storage location is selectively changeable from a user interface; and, the interface is configured to initiate the generating of the electronic images.

15. A method of making images of documents according to claim 11, further comprising performing quality control on the electronic images concurrently with the generation of the electronic images.

16. A method of making images of documents according to claim 15, wherein performing quality control on the electronic images is performed on the interface; and the interface is configured to initiate the generating of the electronic images.

17. A method of making images of documents according to claim 11, further comprising further comprising automatically generating and inserting reference numbers into the electronic images.

18. A method of making images of documents according to claim 17, wherein:

the reference numbers are inserted into each electronic image before making the physical copy of the document; and the reference numbers are included in the physical copy.

19. A method of making images of documents according to claim 11, further comprising: copying the images onto a medium; and storing a viewer program on the medium.

20. A method of making images of documents according to claim 19, wherein generating the electronic images includes generating the electronic images in an initial format; and copying the images onto the medium includes copying the images onto the medium in the initial format.

21. An imaging system, comprising:

a scanner configured to generate a collection of electronic images for a set of documents having multiple groups of one or more documents within the set of documents;

a control system connected to the scanner and configured to substantially concurrently store the collection of electronic images, binding information for the set of documents, and organizational data pertaining to the set of documents in a long-term memory, wherein the organizational data comprises relating the binding information for each group of documents within the set of documents to a sequence location within the set of documents; and an interface linked to the scanner and the control system, wherein the interface is con figured to allow the user during the generation of the collection of electronic images for the set of documents to sequentially:

indicate a start to the set of documents;

enter a beginning sequence location and type of binding element for a first binding element prior to the generation of the electronic images for a first group of one or more documents within the set. of documents, wherein the type of binding element is selected along with a presented selection of document scanning options that correspond to a desired binding element, wherein the document scanning options comprise:

a scan stapled document option to correlate a scanned document with a staple as the binding element; and a scan loose document option to correlate a scanned document with a second type of binding element;

enter an ending sequence location for the first binding element after the generation of the electronic images for the first group of one or more documents;

enter a beginning sequence location and type of binding element for a second binding element prior to the generation of the electronic images for a second group of one or more documents within the set of documents, wherein the type of binding element is selected from the presented selection of a document scanning options;

enter an ending sequence location for the second binding element after the generation of the electronic images for the second group of one or more documents; and indicate an end to the set of documents.

22. An imaging system according to claim 21, wherein the organizational data further comprises at least one of descriptive information of the electronic images, document range information, and duplex information.

23. An imaging system according to claim 21, wherein the scanner comprises a multi-function device.

24. An imaging system according to claim 21, wherein the scanner and the control system are integrated into a single machine.

25. An imaging system according to claim 22, wherein the organizational data further comprises at least one flag associated with an individual image.

26. An imaging system according to claim 25, wherein the flag indicates at least one of a position of the associated individual image in a document, a position of the associated individual image with respect to a binding element, an identity of a binding element, and whether the associated individual image corresponds to a duplex side of a document.

27. An imaging system according to claim 21, wherein the interface is configured to receive commands and organizational information relating to the images and transfer the commands and organizational information to the control system.

28. An imaging system according to claim 27, wherein the interface includes a voice recognition system.

29. An imaging system according to claim 27, wherein the organizational information includes information relating to at least one of a position of an associated individual image in a document, a position of an associated individual image with respect to a binding element, an identity of a binding element, and whether an associated individual image corresponds to a duplex side of a document.

30. An imaging system according to claim 21, further comprising a display connected to the control system, wherein the control system is configured to selectively provide the images and the organizational data to the display.

31. An imaging system according to claim 21, further comprising a printer connected to the control system and configured to print the images.

32. An imaging system according to claim 21, wherein the control system is configured to export the images, the organizational data, and a resource for viewing the images to a storage medium.

33. An imaging system according to claim 21, wherein the control system is configured to export the images to a second system, wherein the second system is configured to facilitate processing of the images.

34. An imaging system for making images of multiple groups of documents by a user, comprising:
a multi-function device configured to generate the images and substantially concurrently generate physical copies of the images;
an interface linked to the multi-function device and configured to receive organizational information from the user regarding an organization of the multiple groups of documents, wherein the organizational information comprises:
binding information;
range information; and
image description information; and
a control system connected to the multi-function device and the interface, wherein during the generation of the images the control system is configured to:
receive the organizational information from the interface, wherein:
a beginning sequence location and type of binding element for a first binding element is received from the interface prior to the generation of a first group of electronic images, wherein the type of binding element is selected along with a presented selection of document scanning options that correspond to a desired binding element, wherein the document scanning options comprise:
a scan stapled document option to correlate a scanned document with a staple as the binding element; and
a scan loose document option to correlate a scanned document with a second type of binding element;
an ending sequence location for the first binding element is received from the interface after the generation of the first group of electronic images;
a beginning sequence location and type of binding element for a second binding element is received from the interface prior to the generation of a second group of electronic images and prior to the completion of the generation of the first group of electronic images, wherein the type of binding element is selected from the presented selection of a document scanning options; and
an ending sequence location for the second binding element is received from the interface after the generation of the second group of electronic images and prior to the completion of the generation of the first group of electronic images;
generate organizational data based on the organizational information;
associate the organizational data with the images concurrently with the generation of the images; and
store the organizational data and the images in a long-term memory.

35. An imaging system according to claim 34, wherein the interface comprises a voice recognition system.

36. An imaging system according to claim 34, wherein the multi-function device and the control system are integrated into a single machine.

37. An imaging system according to claim 34, wherein the organizational data includes at least one flag associated with an individual image.

38. An imaging system according to claim 37, wherein the flag indicates at least one of a position of the associated individual image in an individual document, a position of the associated individual image with respect to a binding element, an identity of a binding element, and whether the associated individual image corresponds to a duplex side of an individual.

39. An imaging system according to claim 34, wherein the organizational information includes information relating to at least one of a position of an associated individual image in an individual document, a position of an associated individual image with respect to a binding element, an identity of a binding element, and whether an associated individual image corresponds to a duplex side of an individual.

40. An imaging system according to claim 34, further comprising a display connected to the control system, wherein the control system is configured to selectively provide the images and the organizational data to the display.

41. An imaging system according to claim 34, further comprising a printer connected to the control system and configured to print the images.

42. An imaging system according to claim 34, wherein the control system is configured to export the images, the organizational data, and a resource for viewing the images to a storage medium.

43. An imaging system according to claim 34, wherein the control system is configured to export the images to a second system, wherein the second system is configured to facilitate processing of the images.

44. A computer system configured to:
control a scanner to generate image data corresponding to a set of images;
control a printing device to make a physical copy of the images substantially concurrently with generating the image data;
receive organizational information relating to the set of images during generation of the image data, wherein the organizational information comprises:
binding information comprising:
a beginning sequence location and type of binding element for a first binding element received prior to the generation of the image data corresponding to a first group of one or more documents within the set of images, wherein the type of binding element is selected along with a presented selection of document scanning options that correspond to a desired binding element, wherein the document scanning options comprise:
a scan stapled document option to correlate a scanned document with a staple as the binding element; and
a scan loose document option to correlate a scanned document with a second type of binding element;
an ending sequence location for the first binding element received after the generation of the image data corresponding to the first group of one or more documents;
a beginning sequence location and type of binding element for a second binding element received prior to the generation of the image data corresponding to a second group of one or more documents within the set of images, wherein the type of binding element is selected from the presented selection of a document scanning options; and
an ending sequence location for the second binding element received after the generation of the image data corresponding to the second group of one or more documents;
range information; and
image description information;
generate organizational data associated with the set of images according to the organizational information substantially concurrently with the generation of the image data; and
store the organizational data in a long-term memory with the image data corresponding to the set of images.

45. A computer system according to claim 44, wherein the computer system includes a voice recognition system connected to the scanner and configured to receive commands relating to the set of images and to control the scanner.

46. A computer system according to claim 44, wherein the set of images correspond to documents.

47. A computer system according to claim 44, wherein the organizational data includes at least one flag associated with an individual image.

48. A computer system according to claim 47, wherein the flag indicates at least one of a position of the associated individual image in a document, a position of the associated individual image with respect to a binding element, an identity of a binding element, and whether the associated individual image corresponds to a duplex side of a document.

49. A computer system according to claim 44, further configured to receive commands and organizational information relating to the images via an interface.

50. A computer system according to claim 49, wherein the organizational information includes information relating to at least one of a position of an associated individual image in a document, a position of an associated individual image with respect to a binding element, and whether an associated individual image corresponds to a duplex side of a document.

51. A computer system according to claim 44, further configured to selectively display the images and the organizational data.

52. A computer system according to claim 44, further configured to export the images, the organizational data, and a resource for viewing the images to a storage medium.

53. A computer system according to claim 44, further configured to export the images to a second system, wherein the second system is configured to facilitate processing of the images.

54. A non-transitory computer readable medium storing instructions to be executed on a computer having a long-term memory, wherein the instructions are configured to cause the computer to:
control a multi-function device to generate image data corresponding to a set of images;
control the multi-function device to make a physical copy of the set of images substantially concurrently with generating the image data;
receive organizational information relating to the set of images during generation of the image data, wherein the organizational information comprises:
binding information comprising:
a beginning sequence location and type of binding element for a first binding element received prior to the generation of the image data corresponding to a first group of one or more documents within the set of images, wherein the type of binding element is selected along with a presented selection of document scanning options that correspond to a desired binding element, wherein the document scanning options comprise:
a scan stapled document option to correlate a scanned document with a staple as the binding element; and
a scan loose document option to correlate a scanned document with a second type of binding element;
an ending sequence location for the first binding element received after the generation of the image data corresponding to the first group of one or more documents;
a beginning sequence location and type of binding element for a second binding element received prior to the generation of the image data corresponding to a second group of one or more documents within the set of images, wherein the type of binding element is selected from the presented selection of a document scanning options; and
an ending sequence location for the second binding element received after the generation of the image data corresponding to the second group of one or more documents;
range information; and
description information;
generate organizational data associated with the set of images according to the organizational information concurrently with the generation of the image data; and
store the image data and organizational information in the long-term memory.

55. A non-transitory computer readable medium according to claim 54, wherein the set of images correspond to documents.

56. A non-transitory computer readable medium according to claim 54, wherein the organizational data includes at least one flag associated with an individual image.

57. A non-transitory computer readable medium according to claim 56, wherein the flag indicates at least one of a position of the associated individual image in a document, a position of the associated individual image with respect to a binding element, an identity of a binding element, and whether the associated individual image corresponds to a duplex side of a document.

58. A non-transitory computer readable medium according to claim 54, wherein the program is further configured to cause the computer to receive commands and organizational information relating to the images via an interface.

59. A non-transitory computer readable medium according to claim 58, wherein the organizational information includes information relating to at least one of a position of an associated individual image in a document, a position of an associated individual image with respect to a binding element, and whether an associated individual image corresponds to a duplex side of a document.

60. A non-transitory computer readable medium according to claim 54, wherein the program is further configured to cause the computer to selectively display the images and the organizational data.

61. A non-transitory computer readable medium according to claim 54, wherein the program is further configured to cause the computer to export the images, the organizational data, and a resource for viewing the images to a storage medium.

62. A non-transitory computer readable medium according to claim 54, wherein the program is further configured to cause the computer to export the images to a second system, wherein the second system is configured to facilitate processing of the images.

63. A method for making images of a plurality of documents by a user, comprising:
generating image data corresponding to the plurality of documents;
storing the image data in a long-term memory;
generating organizational data relating to the documents concurrently with the generation of the image data, wherein the organizational data comprises:
document binding information, comprising:
a beginning sequence location and type of binding element for a first binding element corresponding to a first group of one or more documents from among the plurality of documents entered into a user interface by the user prior to the generation of the image data for the first group of one or more documents, wherein the type of binding element is selected along with a presented selection of document scanning options that correspond to a desired binding element, wherein the document scanning options comprise:

a scan stapled document option to correlate a scanned document with a staple as the binding element; and a scan loose document option to correlate a scanned document with a second type of binding clement;

an ending sequence location for the first binding clement entered into the user interface by the user after the generation of the image data for the first group of one or more documents;

a beginning sequence location and type of binding element for a second binding element corresponding to a second group of one or more documents from among the plurality of documents entered into the user interface by the user prior to the generation of the image data for the second group of one or more documents, wherein the type of binding element is selected from the presented selection of a document scanning options;

an ending sequence location for the second binding element entered into the user interface by the user after the generation of the image data for the second group of one or more documents;

document range information; and document description information;

associating the organizational data with the image data; and storing the associated organizational data in the long-term memory.

64. A method according to claim 63, further comprising receiving verbal commands relating to at least one of the images and the organizational data.

65. A method according to claim 63, wherein the organizational data includes at least one flag associated with an individual image.

66. A method according to claim 65, wherein the flag indicates at least one of a position of the associated individual image in the plurality of documents, a position of the associated individual image with respect to a binding element, an identity of a binding clement, and whether the associated individual image corresponds to a duplex side of a document.

67. A method according to claim 63, wherein the organizational information includes information relating to at least one of a position of an associated individual image in plurality of documents, a position of an associated individual image with respect to a binding element, and whether an associated individual image corresponds to a duplex side of a document.

68. A method according to claim 63, further comprising selectively displaying the images and the organizational data.

69. A method according to claim 63, further comprising exporting the images, the organizational data, and a resource for viewing the images to a storage medium.

70. A method according to claim 63, further comprising exporting the images to a second system, wherein the second system is configured to facilitate processing of the images.

* * * * *

UNITED STATES PATENT AND TRADEMARK OFFICE
CERTIFICATE OF CORRECTION

| | |
|---|---|
| PATENT NO. | : 7,839,532 B2 |
| APPLICATION NO. | : 10/735330 |
| DATED | : November 23, 2010 |
| INVENTOR(S) | : Brawn et al. |

It is certified that error appears in the above-identified patent and that said Letters Patent is hereby corrected as shown below:

In column 17, claim 17, line 28, delete the second occurrence of the phrase "further comprising."

Signed and Sealed this
Eighteenth Day of January, 2011

David J. Kappos
*Director of the United States Patent and Trademark Office*